United States Patent [19]
Dehne

[11] 3,844,400
[45] Oct. 29, 1974

[54] CONTROL SYSTEM FOR ACCUMULATING CONVEYORS

[75] Inventor: Clarence A. Dehne, Farmington, Mich.

[73] Assignee: Jervis B. Webb Company, Detroit, Mich.

[22] Filed: Aug. 17, 1972

[21] Appl. No.: 281,523

[52] U.S. Cl................ 198/40, 221/10, 221/11
[51] Int. Cl............................................ B65g 43/00
[58] Field of Search ................ 221/10, 11; 198/40

[56] References Cited
UNITED STATES PATENTS

| | | | |
|---|---|---|---|
| 2,052,840 | 9/1936 | Nussbaum | 198/40 |
| 3,045,803 | 7/1962 | Bruce | 198/40 |
| 3,279,581 | 10/1966 | Drennan | 198/32 |
| 3,434,431 | 3/1969 | Dehne | 104/172 S |

Primary Examiner—Evon C. Blunk
Assistant Examiner—Joseph E. Valenza
Attorney, Agent, or Firm—Farley, Forster and Farley

[57] ABSTRACT

A control system which causes the carriers of an accumulating conveyor to be advanced in groups to an accumulation zone as required, thereby increasing the service life of the equipment involved in the accumulating action as compared to the operation of a conveyor which advances all carriers to the accumulation zone where they are moved forward intermittently, one by one, until released therefrom. The control system of the invention includes a feeder stop in advance of the accumulation zone, and controls which cause the stop to open in response to a demand for a group of (n) carriers and to close in response to the passage of the group of (n) carriers through the feeder stop.

7 Claims, 4 Drawing Figures

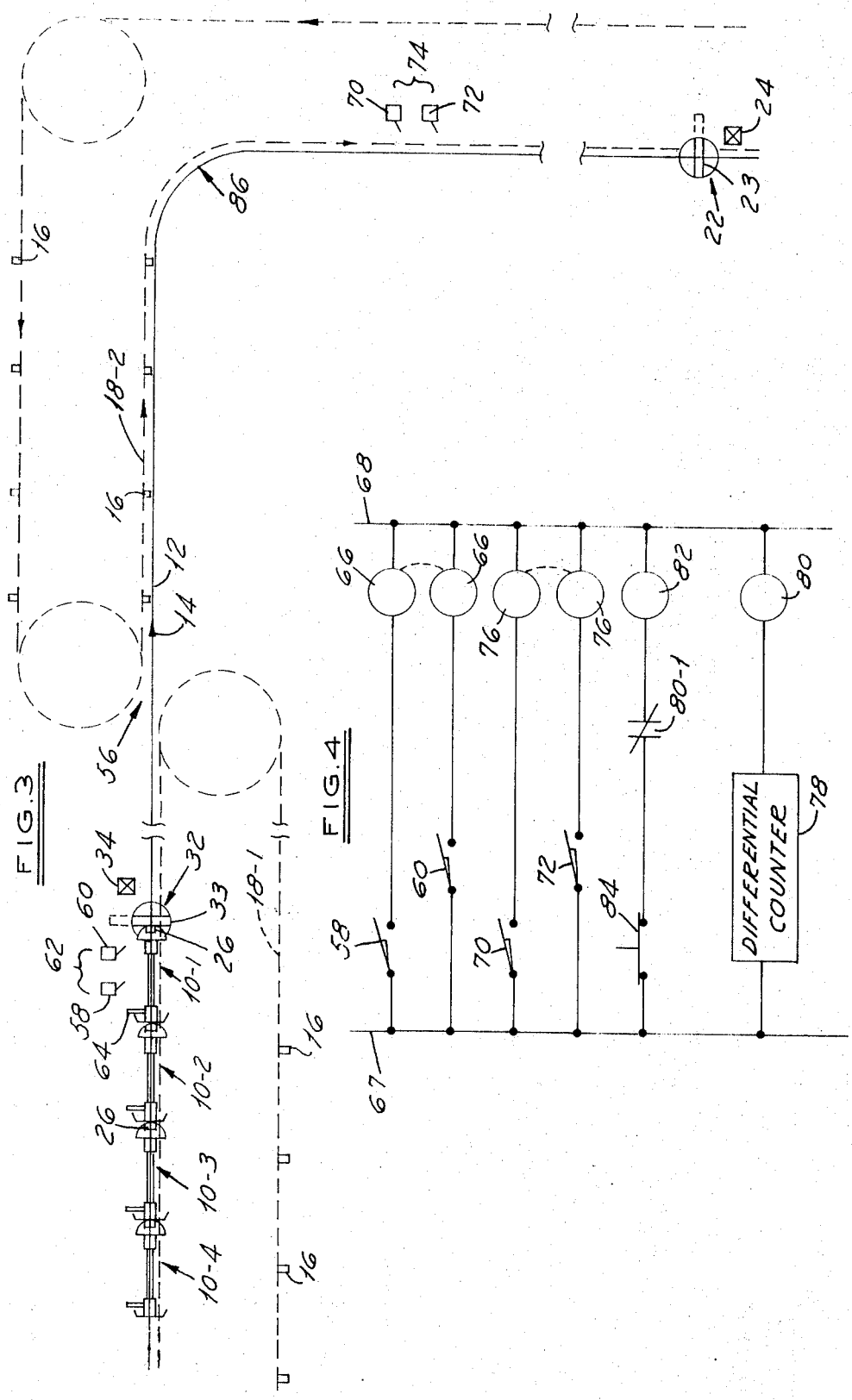

CONTROL SYSTEM FOR ACCUMULATING CONVEYORS

SUMMARY OF THE INVENTION

This invention relates to an improved control system for an accumulating conveyor, particularly a conveyor of the power and free type in which a plurality of carriers are movable in a forward direction along a supporting track by engagement between a driving member on each carrier and one of a plurality of pushers connected to a propelling member supported from an adjacent track, the driving member of each carrier being disengageable from the pushers for the accumulation of carriers.

Such conveyors generally include one or more accumulation zones provided with a stop movable between open and closed positions. In the closed position, the stop produces a disengaging action between a pusher and the driving member of a carrier being propelled thereby, arrests forward movement of this carrier, and thereby initiates the accumulation of following carriers. As these following carriers in turn engage a preceding stopped carrier, a disengaging action between the pushers and the carrier driving members sequentially occurs, and a bank of accumulated carriers builds up. Such an accumulation zone may, for example, be employed in advance of a work station, a dispatching station, or on a carrier storage line. In any case, the stop is located at the head end of the accumulation zone and is operated to release one carrier on each opening-closing cycle. After each such cycle, all other carriers in the bank at the accumulation zone are advanced one carrier length by successive engagement of their driving members with pushers and disengagement therefrom. This repeated starting and stopping of carriers as they move through the accumulation zone adversely effects the service life of the conveyor components involved in the accumulation action, and this condition is accentuated by the tendency in present conveyors to accumulate greater numbers of carriers at accumulation zones in order to provide reserve banks which compensate for work stoppage and other causes of downtime in the operations served by the conveyor.

The object of the present invention is to provide a control system for an accumulation conveyor which will cause the carriers thereof to be moved to an accumulation zone in groups rather than individually, thereby greatly increasing the service life of the components involved in the accumulation action.

The control system of the invention comprises a feeder stop, located in advance of an accumulation zone, and movable between closed and open positions, the stop in the closed position being capable of causing the disengagement of the driving member of a carrier from a pusher and of arresting forward movement of the carrier to initiate the accumulation of a bank of following carriers, together with control means for causing the opening and closing of the feeder stop to release a group of ($n$) carriers from the bank. The opening control means includes a control device responsive to the absence of a carrier between the feeder stop and a control location spaced therefrom along the carrier support toward the accumulation zone a distance not less than the length of the group of ($n$) carriers when accumulated; and, the stop closing control means includes a control device responsive to the passage of the group of ($n$) carriers through the feeder stop.

Alternate forms of control devices are disclosed. In one form, the control device for the stop closing control means is capable of adding the numbers of carriers passing through the feeder stop and of producing a closing signal in response to the number ($n$); and, the control device for the stop opening control means is capable of subtracting the number of carriers passing the control location and producing a stop opening signal in response to the number ($n$).

Another form of stop opening control device involves the use of a sensing element in combination with a time delay operable to actuate a circuit for opening the feeder stop. If the sensing element is not actuated by a carrier within the time delay period, this signifies that the last carrier of the group has passed the sensing element. An alternate form of stop closing control device includes a pair of carrier sensing elements installed along the carrier support, connected in parallel in a control circuit, and responsive to the presence of a carrier at positions corresponding to ($n - 1$) and ($n$) carriers in advance of the location of the sensing element of the stop opening control device.

Other features and advantages of the invention will appear from the description to follow of the representative embodiments thereof disclosed in the accompanying drawings.

DESCRIPTION OF THE DRAWINGS

FIG. 3 is a schematic plan view of a portion of a power and free conveyor illustrating another application of the control system of the invention; and, FIG. 4 is a schematic circuit diagram showing the control devices employed in the control system of FIG. 3.

DESCRIPTION OF THE PREFERRED EMBODIMENT

Schematic illustrations have been employed for the accompanying drawings because of the various known types of accumulating conveyors to which the control system of the invention is applicable, and because the individual control elements employed in the control system of the invention are known. The drawings illustrate the application of the control system to the type of accumulating conveyor known as a power and free conveyor, and further information on the construction of some types of such conveyors, including carriers and stops for providing accumulating action, may be found in U.S. Pat. Nos. 3,044,416, 3,229,645, 3,434,431 and 3,559,585, all owned by the assignee of the present invention. However, it will be understood that the control system of the invention is applicable to other conveyors in which carriers are accumulated at accumulation zones.

Figure 1:
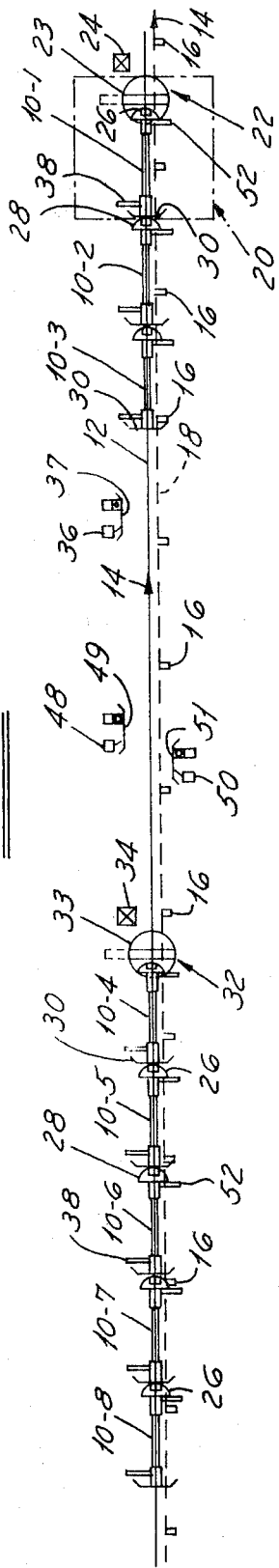
FIG. 1 is a schematic plan view of a portion of a power and free accumulating conveyor illustrating the control system of the invention as employed in connection with a work station having an accumulation zone in advance thereof.

In FIG. 1, the solid line 12 represents a track upon which carriers 10-1, 10-2, 10-3, etc., are supported and are propelled in a forward direction 14 by pushers 16 connected to a continuously driven propelling member 18, supported from an adjacent track of a power line. A work station 20 along the carrier track 12 is provided with a primary stop 22 having at least one member 23 movable between a closed and an open position by a fluid pressure actuator (not shown) regulated by a solenoid valve 24. When the stop member 23 is in the closed position, forward movement of the carrier 10-1 is arrested at the work station 20 and the stop causes a disengaging action to take place between a pusher 16 and a main driving dog 26 on the carrier 10-1 being propelled by such pusher. Each of the other carriers has a main driving dog 26, and a similar disengaging action is produced when a member 28 on the front of a carrier encounters a cam 30 on the rear of a preceding stopped carrier. As long as forward movement of the carrier 10-1 is arrested by the stop 22, any following carriers 10-2 and 10-3 successively stop and accumulate behind the carrier 10-1, as shown.

Energizing the solenoid valve 24 moves the primary stop 22 to the open position and permits the driving dog 26 of the carrier 10-1 to be engaged by the next oncoming pusher 16, releasing this carrier from the work station 20. The stop 22 is closed when the solenoid valve 24 is deenergized. Each accumulated carrier 10-2 and 10-3 is then successively moved forward one carrier length, since the forward movement of the released carrier 10-1 permits the driving dog 26 of the next following carrier 10-2 to be engaged by the next oncoming pusher, and movement of the carrier 10-2 results in a similar action on the carrier 10-3. This engaging and disengaging action between the pushers and the carrier driving dogs, or start and stop movement of the carriers, takes place with respect to all carriers accumulated in advance of the stop at the work station, and the number of times this movement occurs depends upon the number of carriers in the bank accumulated. For example, if there are 10 carriers accumulated at the work station, each carrier must start and stop 10 times in the process of passing through the work station.

The control system of the present invention provides a means for materially reducing this start and stop action of individual carriers in passing through a work station or other control stations of a conveyor where a primary stop is used. As shown in FIG. 1, the control system comprises a feeder stop 32, also including a stop member 33 movable between closed and open positions under the regulation of a solenoid valve 34. This feeder stop 32 is installed along the carrier track 12 at a location in advance of the primary stop 22, and when the feeder stop 32 is in the closed position, it is capable of causing the disengagement of the driving member of a carrier 10-4 from a pusher and of arresting forward movement thereof, thereby initiating the accumulation of a bank of following carriers 10-5 . . . 10-8. Control means, to be described below, cause the opening and closing of the feeder stop 32 to release a group of (n) carriers from the bank.

The application of the control system of the invention illustrated in FIG. 1, assumes that it has been determined from the requirements of the conveyor and operations of the work station 20 served thereby that a minimum reserve bank of two carriers is required in advance of the work station 20, as shown by the carriers 10-2 and 10-3; and, that a group of four carriers should be released by the feeder stop 32 when this minimum is reached.

Figure 2:
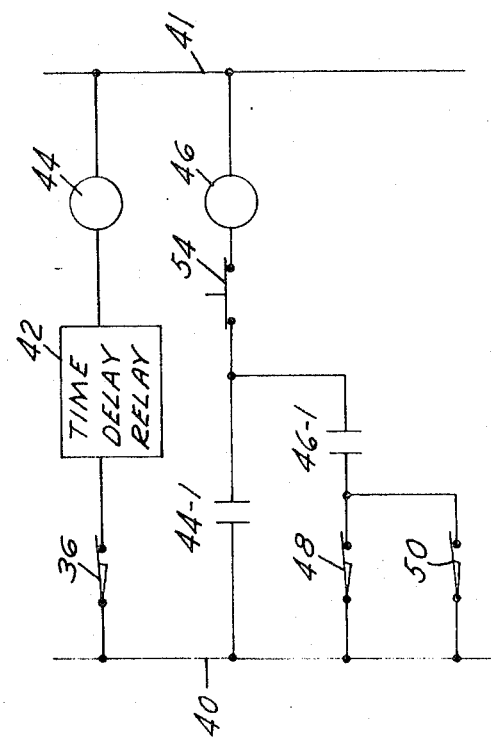
FIG. 2 is a schematic circuit diagram including the control devices employed in the control system of FIG. 1.

The control means for causing the opening of the feeder stop 32 consists of a control device including a limit switch 36 operated by a movable shoe 37 engageable by a pin or probe 38 projecting from the left side of each carrier toward the rear end thereof. The limit switch 36 is responsive to the absence of a carrier at a control location corresponding to the third carrier position in advance of the work station 20, which location is in turn spaced from the feeder stop 32 along the carrier support a distance not less than the length of the group of four carriers when accumulated. As shown in FIG. 2, the limit switch 36 is installed in a control circuit between power lines 40 and 41 in series with a time delay relay 42 and a control relay 44. When the limit switch operating shoe 37 is not engaged by a pin 38 of a carrier, the limit switch 36 is closed and the time delay relay 42 is actuated, this relay being set for an time interval slightly greater than that between successive passing carriers, as determined from the speed of travel of the propelling member 18 and the spacing of the pushers 16 thereon. If the timing relay 42 times out, the control relay 44 is energized, closing a normally open contact 44-1 thereof in series with a relay 46 for the solenoid valve 34, causing the feeder stop 32 to move to the open position and closing a normally open contact 46-1 to hold the stop open until the group of four carriers has been released.

The stop closing control means includes a control device responsive to the passage of the group of four carriers through the feeder stop 32, and in the control system shown in FIGS. 1 and 2 comprises a limit switch 48 and a limit switch 50 connected in parallel with the contact 46-1 of the control relay 46 for the feeder stop. The limit switch 48 is normally closed, is operated by a shoe 49 contacted by the pin 38 of a carrier and is installed along the carrier track 12 at a position corresponding to the position of the third accumulated carrier in advance of the location of the limit switch or carrier sensing element 36 of the stop opening control means. The limit switch 50 is also normally closed, is operated by a shoe 51 contacted by a control pin 52 on the right front side of a carrier and is installed at a position corresponding to that of the fourth accumulated carrier of the group in advance of the location of the limit switch 36. When the limit switches 48 and 50 of the closing control device are successively opened, the control relay 46 for the secondary stop 32 is deenergized and the feeder stop closes. A manual switch 54 in series with the relay 46 permits the feeder stop 32 to be turned off, when desired.

Another example of the control system of the invention is illustrated in FIGS. 3 and 4 wherein corresponding reference numerals have been used for similar components. Carriers 10-1, 10-2, etc., are advanced along a supporting track in a forward direction 14, by engagement between the driving dog 26 on each carrier and one of a plurality of pushers 16 connected to a forwarding propelling member 18-1, through a transfer zone 56 where the carriers are then engaged by pushers on a receiving propelling member 18-2. The receiving propelling member 18-2 may extend along a storage or work area of the conveyor and may include one or more primary stops 22 from which carriers are sequentially released for further forward movement.

A feeder stop 32 is installed along the carrier supporting track 12 in advance of the transfer zone 56 and is operated by opening and closing control means to release a group of (n) carriers each time the stop is opened.

The closing control means includes a pair of limit switches 58 and 60 mounted in longitudinally spaced relation adjacent the carrier track 12 at an add zone 62 less than a carrier length in advance of the feeder stop 32. These limit switches are operable by a pin 64 on each of the carriers and are connected to an add relay 66 between power lines 67 and 68 of the control circuit shown in FIG. 4. The opening control means includes a pair of limit switches 70 and 72 installed along the carrier track 12 at a subtract zone 74 located forwardly along the carrier track 12 from the feeder stop 32 a distance greater than the combined length of the group of (n) carriers released by the feeder stop 32. These limit switches 70 and 72 are also actuatable by the pin 64 on each carrier and are connected with a subtract relay 76 in the control circuit of FIG. 4. A differential counter 78 in this circuit controls a counter relay 80 having a normally closed contact 80-1 in series with a relay 82 for the solenoid valve 34 of the feeder stop 32. A manual switch 84 in series with the stop control relay 82, when closed, opens the feeder stop 32 and initiates the group feeding action thereof.

Again assuming it is desired to release carriers in groups of four, each carrier 10-1 . . . 10-4 passing through the open stop 32 actuates the limit switches 58 and 60 causing the add relay 66 to emit one pulse to the differential counter 78 which has been set for four pulses maximum, zero pulses minimum. After four pulses have been registered by the differential counter 78 from the limit switches of the add zone 62 and the add relay 66, the counter relay 80 is energized, opening the contact 80-1 and deenergizing the stop control relay 82 to cause the stop to close. The group of four carriers released are advanced through the transfer zone 56, are engaged by pushers of the receiving propelling member 18-2 and then successively travel past the subtract zone 74 where each carrier actuates the limit switches 70 and 72 causing the subtract relay 76 to transmit a subtract pulse to the differential counter 78. Four such subtract pulses return the differential counter 78 to zero setting, deenergizing the counter relay 80 and re-energizing the stop control relay 82 to re-open the stop 32.

In order to obtain the maximum benefit from the control system of the invention in reducing the starting and stopping of individual carriers, it is desirable that each group of carriers released by a feeder stop move forward as a group without interruption to the next control zone of the conveyor. Where the control system is employed in connection with the feeding of groups of carriers from a forwarding propelling member to a receiving propelling member as illustrated in FIG. 3, the feeder stop 32 should preferably be installed a sufficient distance in advance of the transfer zone 56 so that there will be no pause in the movement of the group of carriers released which would reinitiate the accumulating action. In a conveyor using multiple trolley carriers connected by tow or load bars, the pusher spacing should be such that one carrier will not overtake another on a horizontal turn 86 (FIG. 3) in the carrier track 12 due to the chording action.

While a differential type of counter 78 has been employed in the control system shown in FIGS. 3 and 4, it is obvious that other forms of counting devices could be employed, such as star-wheel counters, for example.

The differential type of counter is presently preferred because of its reliability, especially when controlled by pairs of carrier sensing elements 58 and 60, and 70 and 72, for each of the add and subtract functions.

I claim:

1. A control system for a conveyor having a plurality of carriers movable in a forward direction along a support by engagement between a driving member on each carrier and one of a plurality of pushers connected to a propelling member, the driving member of each carrier being disengageable from the pushers by a stop which arrests forward movement of the carrier and being disengageable from the pushers for the accumulation of carriers in response to engagement between the carrier and a preceding stopped carrier; wherein the improvement comprises:

a primary carrier stop movable between closed and open positions to release carriers sequentially;

a carrier feeder stop installed along the carrier support in advance of the primary stop and movable between closed and open positions, the feeder stop in the closed position being capable of causing the disengagement of the driving member of a carrier from a pusher and of arresting forward movement of the carrier to initiate the accumulation of a bank of following carriers; and, control means for opening the feeder stop in response to the absence of a carrier between the feeder stop and a control location spaced from the feeder stop toward the primary stop in the forward direction of carrier movement a distance not less than the length of a group of (n) carriers when accumulated, and for closing the feeder stop in response to the passage of the group of (n) carriers through the feeder stop.

2. A conveyor system according to claim 1 wherein the control means includes a control device at said control location actuatable by each passing carrier, and means for counting the actuation of said control device to determine the number of (n) carriers in said group.

3. A control system according to claim 1 wherein the control means includes a control device adjacent to the feeder stop actuatable by each passing carrier, and means for counting the actuations of said control device to determine the number of (n) carriers in said group.

4. A conveyor system according to claim 1 wherein the control means includes a first control device adjacent to the feeder stop actuatable by each passing carrier and a second control device at the control location actuatable by each passing carrier, and counting means for adding the number of actuations of the first control device and producing a stop closing signal in response to the number (n) and subtracting the number of actuations of the second control device and producing a stop opening signal in response to the number (n).

5. A conveyor system according to claim 1 wherein said control means for opening the feeder stop includes a control circuit, a carrier sensing element operable to close the control circuit in response to the absence of a carrier at said control location and a time delay relay connected in the control circuit in series with said sensing element.

6. A conveyor system according to claim 5 wherein control means for closing the feeder stop includes a pair of carrier sensing elements installed along the carrier support and responsive to the presence of a carrier at positions corresponding to (*n* minus 1) and (*n*) carriers in advance of said control location, and a control circuit in which said pair of sensing elements are connected in parallel with a control relay for the feeder stop.

7. A conveyor system according to claim 4 wherein each control device is operated by a pair of carrier sensing elements installed along the carrier support at a control zone, one carrier sensing element being responsive to the entrance of a carrier into such control zone and the other sensing element being responsive to the exit of a carrier from such control zone.

* * * * *